United States Patent [19]

De Villeroche

[11] Patent Number: 4,951,211

[45] Date of Patent: Aug. 21, 1990

[54] ELECTRONIC GUIDING AND INFORMATION SYSTEM FOR TRAFFIC

[76] Inventor: Gerard J. De Villeroche, 102, Rue de Pont-a-Mousson, 57158 Montigny, France

[21] Appl. No.: 349,935

[22] Filed: Apr. 28, 1989

Related U.S. Application Data

[63] Continuation-in-part of Ser. No. 844,391, Mar. 26, 1986, abandoned.

[30] Foreign Application Priority Data

Jul. 27, 1984 [EP] European Pat. Off. ........ 84401584.2

[51] Int. Cl.$^5$ .............................................. G06F 15/50
[52] U.S. Cl. ..................................... 364/444; 340/995
[58] Field of Search ................... 364/424.04, 443, 444, 364/449, 436; 73/178 R; 340/988, 990, 995

[56] References Cited

U.S. PATENT DOCUMENTS

| | | | |
|---|---|---|---|
| 4,481,584 | 11/1984 | Holland | 364/424 |
| 4,546,439 | 10/1985 | Esparza | 364/444 |
| 4,570,227 | 2/1986 | Tachi et al. | 364/444 |
| 4,631,678 | 12/1986 | Angermüller et al. | 364/449 |
| 4,646,089 | 2/1987 | Takanabe et al. | 364/449 |
| 4,677,450 | 6/1987 | Ito et al. | 364/449 |
| 4,688,176 | 8/1987 | Hirata | 364/449 |

Primary Examiner—Gary Chin
Attorney, Agent, or Firm—Darby & Darby

[57] ABSTRACT

An apparatus (40) codes and stores cartographic data and general information relative to an area. A storage apparatus (31) transfers them after payment to memory media (1). An inboard apparatus (2) receives memory media, selects a route and provides driving indications in order to guide the vehicle in said route and general information in correlation with conspicuous points of the followed route.

29 Claims, 3 Drawing Sheets

ELECTRONIC GUIDING AND INFORMATION SYSTEM FOR TRAFFIC

This is a continuation of application Ser. No. 844,391, filed Mar. 26, 1986 now abandoned.

The invention relates to a simple, optimized and complete guidance system for traffic especially in the city and on the road, to replace the everyday operations of the driver of any vehicle who needs to read a map or to plan to find his location and his route.

This system replaces the irksome reading of a map by a progression on a screen of a schematized itinerary as the user enters the sections of his trip. It replaces paper maps and plans but also coordinates, at the initiative of the driver himself, the acquisition of specific cultural, municipal, road-safety or commercial information and thus takes the place of special guides, books, newspapers and even of bulletins which, although useful, cannot reach him today. It fills a communication gap customized for a trip, which is important for safety and for commerce.

The invention can also be applied to maritime, river or aerial navigation, as well as to process control, teaching, training, instruction and tourism.

At the present time, in order to find one's way in a given geographic area, there are road maps or city guides. Road maps do not have an alphabetical index of localities served by the roads, and it is sometimes necessary to search for a long time to find one's destination locality. City guides do have an index but it is also necessary to refer to the map in order to try and define one's itinerary on the basis of the information appearing there, such as one-way streets, for example, or by visually comparing one itinerary with another. In both cases it is necessary to mark the starting point and destination on the map, then choose an itinerary with just the knowledge of the information on a voiceless paper document, hence with no possibility of utilizing other periodical data, such as a market day in a street, for example, or temporary events such as a street torn up, or more general things such as cultural information for example.

Today the driver of a vehicle is often obliged to follow his itinerary on the map with his finger, or to call on a navigator as he enters sections of his trip. And likewise the driver is often obliged to ask his way. He then receives instructions to go straight ahead, then, for example, take the third left, then the first right, etc.

Furthermore, the person travelling in this same geographic area is unable to form interrelations of information between the names of roads and sites and places he is passing except with material previously memorized or found in guides, books or newspapers, but not available to him as he travels. The driver can be interested in something he sees and, if possible, question the native on the date of construction of a significant structure, or the address of a near-by restaurant. If he receives no reply, he will remain uninformed. Moreover, he has forgotten the birthdate of Fleming, the inventor of penicillin although he is in the street that bears his name, or he may not be able to recognize the century of construction of a church that he is passing, or not know the population of a city he is entering, or that a village he would like to travel through was also proud of its low tax rate, or that a certain store has an interesting advertising campaign. The radio he is listening to does not give out this sort of information and cannot have a direct relation to the journey in progress.

It should also be said that today, when a driver asks for information and mentally records the operations and turns he should make, he often forgets and has to ask again. The present invention, which calls on the driver's discretion to evaluate and compare the actual sections of this trip with their schematic representation, does not avoid all cases of loss of orientation. It is then sufficient to note the name of the road on which he is, and to record it as a new starting point, so that the representation of the itinerary to be followed will be given to him again. In the same very simple fashion his starting point will be recorded by the orientation of the vehicle in a non-urban zone, or by simple reference to the name of the road where he is, and to the even or odd numbers, counting upward, in this road. The system according to the invention determines where the vehicle is and which direction it should travel, the precision of the travel being in proportion to the information recorded by the coder.

The known types of electronic vehicle guide do not provide the multiplicity of services covered by the invention. They do not have the same simplicity and the same universality.

In general they involve sophisticated techniques of display of complete maps on screens instead of being limited to an itinerary being followed by the user himself. They have substantial means of controlling the movement of the vehicle relative to the map; they are therefore quite expensive and yet no more convenient. They do not optimize all the movements and do not have the flexibility of use of the invention, enabling the user to choose his itinerary from a number of them, to compare their lengths and have them pass through any desired reference points. And finally they do not all move on the screen at the will of the user as he progresses on his itinerary, or proportionally to the speed of the vehicle.

It could also be said that the known types of electronic guide are voiceless and have no consideration for the interests of the user or in alerting his mind to the things he observes around him as he goes. The user is left in gross ignorance and, he cannot increase his knowledge, except by consulting guides or all sorts of books, something which he cannot undertake while driving. He can receive no message, however important, concerning him directly, as he travels, for example of a municipal or police nature, or any commercial or advertising message, while it may be to his interest to learn, as he is travelling on a street, that the end is under repair, or that there is a parking place, or at dinner time that there is a good restaurant. This information is triggered only at the instigation of the user, and in the case, of course, where a restaurateur wishes to attract clientele passing on his street.

It is evident that no electronic guide as complete and as simple in design has ever offered so much simplicity and so many services to a user, displaying only a schematic itinerary, and yet faithful to the itinerary followed which relates to just one user and displaying the successive sections as desired.

None of them has been of such economic utility owing to simplicity of design, such cultural utility owing to the cultural interrelations it permits, and commercial utility resulting from the business and "sponsorships" that it can generate with the advertising that it expresses. Moreover, the guidance device of the invention involves no captive audience, as does a car radio, since its general information can be heard only when the user so desires.

One of the objects of the invention is to provide a simple and complete optimized electronic system of guidance and traffic information permitting a choice of itinerary, and effective guidance along the entire itinerary by means of information that is perceptible directly and easily.

Another object of the invention is to provide a coding and storage memory device to insure a cartographic survey of a traffic zone and to couple, in a memory, with the names of the streets, sites and places, abstracts of cartographic, municipal, historical, touristic, economic, political, commercial, technical or advertising information so as to lend interest to any itinerary taken and inform the user in the category of information he chooses.

Another object of the invention is to provide information storage elements, also referred to as "memory supports", bearing guidance information and general information which will be easy to market. The memory supports permit the coupling of information of a different nature, while up to now such information was considered incompatible and the subject of documents in forms difficult to compare although complementing one another.

Another object is to provide a storage device that will be available in town, just as magnetic-card banknote dispensing machines are found everywhere today, which will offer at any point, inexpensive memory supports that can be updated by the storage device.

The invention therefore appears as a complete traffic assistance system providing data necessary to the untroubled and informed operations of a vehicle. The optimized electronic guidance and information system for traffic can be used in any geographic zone, regardless of the means of locomotion used.

The subject of the present invention is an electronic guidance and information system for traffic, characterized in that it comprises:

a device for coding and memory storage of cartographic data relative to a zone, and general information corresponding to this zone, a storage device that can deliver, on memory supports, the said data and/or general information.

memory supports to receive the said data and/or general information, and an on-board electronic device for data processing and display, which can receive at least one of the said memory supports, comprising at least one command keyboard, at least one display screen and a manual advance button, and capable of defining at least one itinerary from a starting point and an arrival point defined by means of a keyboard, and displaying, after each command of the advance button, actions to be taken to insure the guidance of a vehicle on the itinerary chosen.

According to other characteristics of the invention:

the device for coding and memory storage of cartographic data includes: a sensitive screen representing a map of a traffic zone; a keyboard identifying the roads appearing on the screen; and electronic means to read the characteristics of each of these roads, such as the orientation relative to the north, the length of the various sections, the width, the points of intersection, the name and the particular reference points; so as to insure the coding and memory storage of the cartographic data relative to each road in the said zone.

The coding and memory storage device also includes: memories for recording general, municipal, historical, touristic, economic, political, commercial or advertising information related to the said roads; and means of correlation between this general information and the cartographic data relative to the said roads.

The storage device includes: memories for storing cartographic data and general information obtained from the coding and memory storage device; means for receiving a prepayment; means for selecting cartographic data and general information to be delivered; electronic means for loading onto the memory supports, selected cartographic data and general information; and means of distribution of the said memory support thus loaded.

The memory supports are constituted by memory cards, coated blocks, magnetic tapes or discs and can be reloaded by the said storage device.

The on-board data processing and display device includes screens for the indication in clear of the starting road, the destination road, the road followed, intermediate reference points and intersecting roads on the left and right, and their rank.

The on-board device also includes screens for the indication of the total length of the trip, the distance remaining to be travelled and secondary information.

The on-board device includes oriented indicator lights representative of driving instructions.

The on-board device includes a screen for schematic representation of the itinerary followed.

The on-board device includes a screen for schematic representation of the section of road followed, and of the next section, with their intersections.

The advance command button insures the step-by-step progression of the sections of road followed, on the said screen.

The on-board device includes command buttons which, when operated, insure the visual or phonic transmission of the general information corresponding to noteworthy points on the itinerary followed, as a function of the correlation insured by the coding and memory storage device between this general information and the cartographic data relative to the said roads.

Other characteristics will appear on reading the description which follows given in reference to the attached drawing in which.

Figure 1:
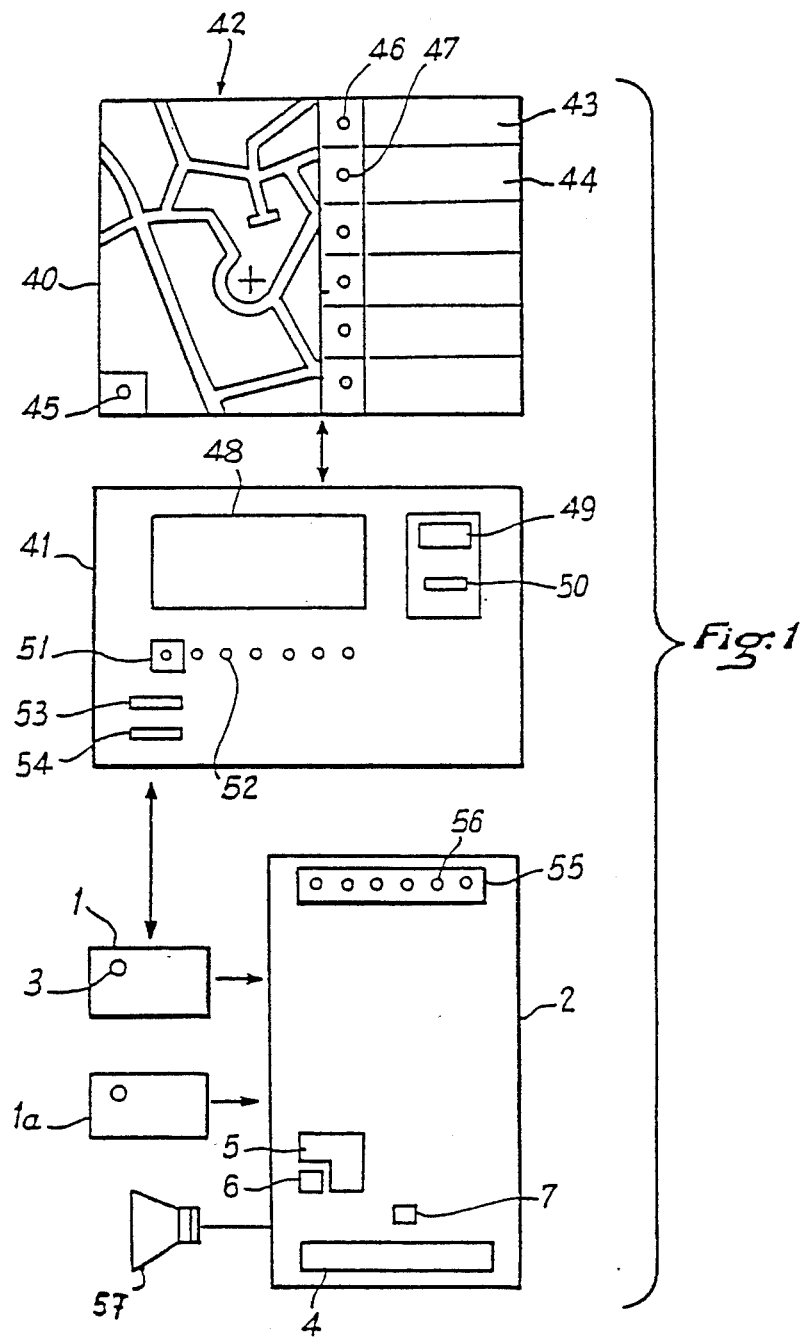
FIG. 1 is a simplified diagram of the electronic guidance and information system adapted to road traffic.

Referring to the drawing, it can be seen (FIG. 1) that the electronic guidance and information system for traffic according to the invention is composed essentially of the following elements:

a device 40 for coding and memory storage of cartographic data relative to a traffic zone, and of general information corresponding to this zone, a device 41 for storage, capable of delivering, on memory supports, the cartographic data and general information coded by the coding and memory storage device 40, supports 1, 1a, of non-volatile memory, to receive the said data and general information, and an on-board electronic data processing and display device 2 capable of receiving at least one of the memory supports 1, 1a.

The data coding and memory storage device 40 insures the coding and memory storage of the cartographic data of a given zone, in the city, for example. On a sensitive means screen 42, an oriented map is shown, and by means of an electronic pencil it is possible to follow on the screen the sections of roads, after identifying them by means of a keyboard, not shown.

The cartographic data thus coded and stored are, for example, for each road section: the orientation relative to the north, the length, the width of the road, the points of intersection, the names and points of reference such as public monuments, churches, squares, etc.

It goes without saying that this means of data acquisition is described purely by way of example and can be replaced by any technical equivalent.

After identification of a section of road and storage of the corresponding coded cartographic data it is possible to store general municipal, historical, touristic, economic, political, commercial or advertising information for example. This information is recorded in memories such as 43 for municipal information, 44 for historical information, etc. This information relating to the section of road identified and the correlation between the section of road and the information of a given type is insured by means of the correlation button 45 and the buttons commanding the respective memories such as 46, 47. By this correlation the general information in memories 43, 44, etc. is coupled to the names of the roads or to their coordinates with a signal of correlation such that the display of the name of a road on a screen of the on-board electronic device 2 makes it possible to relate to the general information in the form of a readable or audible text, for example.

The coding and memory storage device 40 is capable of compacting the various data and items of information to make them recordable on a support of small size. In the event of modification of certain of these data or items of information, this device is capable of the corresponding updating.

Storage device 41 appears as an automatic dispenser of tickets on prepayment. It includes a money receiver 49, a receiver for a credit card or payment card 50, a dialog screen 48 and push buttons for selecting the memory supports it is capable of delivering. These supports can be in the form of memory cards, coated blocks, magnetic tapes or memory discs. The device can hold them in stock storage and receive them from the outside through an admission slot 53. It proceeds to load data and/or information on a card and delivers the card through an outlet slot 54. The buttons permit selection of the cartographic data (button 51) or the information of a particular type, municipal, historical, touristic, economic, political, commercial or advertising for example (button 52 corresponding to the type of information selected). These practical elements are given by way of example and can be replaced by technical equivalents.

Storage device 41 comprises a memory capable of being charged periodically by coding and memory storage device 40 to store compacted data and information to be transferred after prepayment, by reproduction on the memory supports.

Memory supports 1, 1a are non-volatile, protected and nonreproducible supports containing cartographic data usually read on a city plan or road map, and general information in correlation with the noteworthy points along the itineraries followed. These memory supports can be updated by storage device 41. They may bear a microprocessor 3.

A memory support of cartographic data is proper to a city, a quarter, a geographic area, generally covered by a city plan or road map.

It bears primary information that is usually read on a city plan or a road map. This information is supplemented by secondary information on driving customs or advice which can be useful in the driving of the vehicle, ranging from traffic signals to road safety and to sightseeing indications. The primary information relates to traffic roads such as streets, roads, bridges, etc. For every road it includes: identification data, that is to say, the type (street, avenue, cul-de-sac, place, etc.) and the name; special information, that is to say the length, width, the orientation with respect to the north, the direction of flow if there is only one, and the number of road in increasing order, for example in the case of city roads; and information identifying the intersecting roads, that is to say the name, position on the right or left relative to the increasing numbers on the road, and the angle they form with the road, for example.

The secondary information relates to the practicability of the road, the presence of repairs, for example, to easily recognizable reference points on the road or near by, to points of tourist interest, to warning signs (crossings, dangers, speed limits), for example, or to general information.

The cartographic support bears permanent but revisable information, that is to say which can be updated. It covers a well-defined geographic zone. Another cartographic support corresponds to an adjacent zone, so that the replacement of one support by another can insure continuity in the guidance as in the case of adjoining folds or panels of a geographic map.

Furthermore, for the same geographic zone it is possible to provide a first cartographic support relating essentially to traffic information, and a second support containing essentially information of a touristic, historical, commercial, economic or other type.

Different cartographic supports can contain information on different scales such as 1/50,000 and 1/10,000.

The on-board electronic data-processing and display device 2 comprises a set of memories and microprocessors. It can accommodate one or two memory supports such as 1 and 1a. It has a keyboard 4, two command buttons 5 and 6, one for the advance 5 and one for the reverse 6, a "start-stop" button 7 and a certain number of display emplacements which will be described in relation to FIGS. 2 and 3.

The keyboard 4 has alphanumeric keys disposed in classic fashion.

It also has an "Input" key and fast keys for designation of routes or points of reference, permitting each one to record, by a single press, a word such as highway, street, boulevard, avenue, place, station, church or monuments for example.

And finally it has two keys to indicate at the starting point of an itinerary, whether the vehicle is oriented in the increasing or decreasing direction of the numbers on the road. The keyboard is preferably disposed at the bottom of the device. It can be arranged so that data are recorded by touching a screen.

Device 2 also has a certain number of display emplacements. In the remainder of the description these emplacements correspond to specific screens, but they can also correspond to specific zones on a single screen for example. Device 2 also has a frame 55 with command buttons 56 that correspond respectively to municipal, historical, touristic, economic, political, commerical or advertising information that can be contained in memory support 1a, in correlation with the cartographic information on support 1. Device 2 can, moreover, be equipped with a speaker 57.

Figure 2:
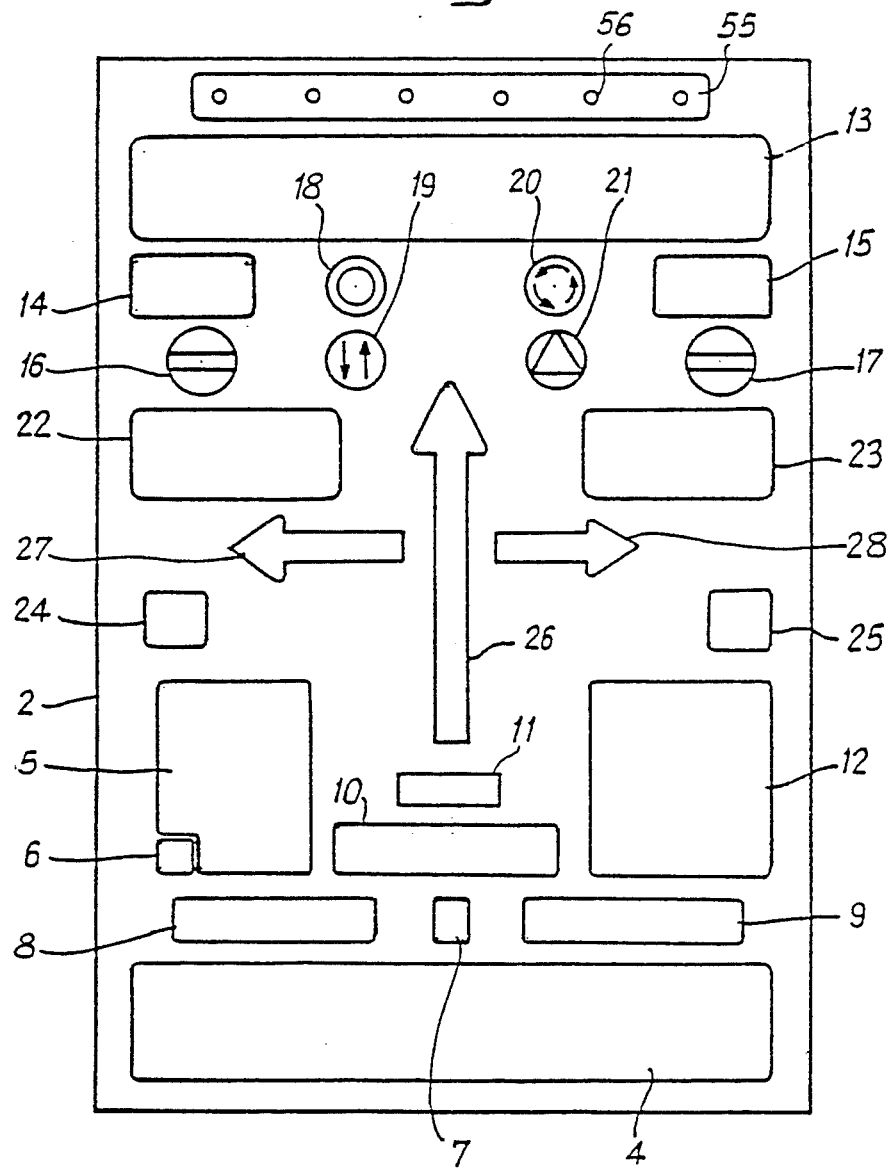
FIG. 2 is a simplified diagram of a first embodiment of the on-board electronic data processing and display device forming part of the system in FIG. 1, and utilizing a representation of the directions of movements by indicator lights.
Figure 3:
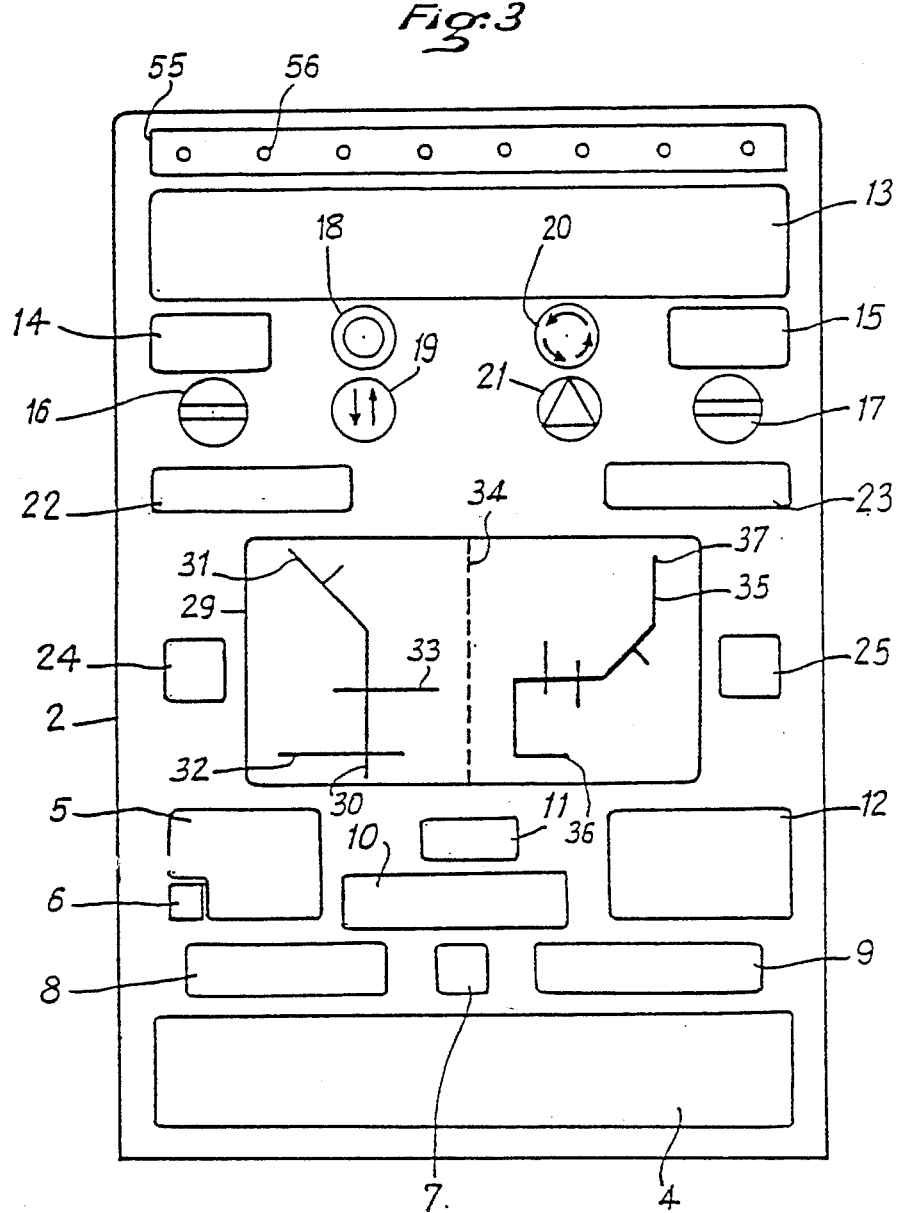
FIG. 3 is a simplified diagram of a second embodiment on the on-board electronic device forming part of the system in FIG. 1, and using a representation of itineraries.

In FIGS. 2 and 3 the screens having the same role are identified by the same references. These flat, cathode-ray, liquid crystal, luminescent or luminous screens occupy the greater part of the surface of the device 2. In the center is the space devoted to the main display, whose disposition varies as a function of the mode or representation selected. Around this central space there are the screens corresponding to the information that is either indispensable to, or helpful in following the route selected.

Just above keyboard 4, the two screens 8 and 9 aligned to the left and right of start-stop button 7, display the name of the starting road and the arrival road, respectively. This display is unchanged for the entire trip. It is a reminder of the data used to define the itinerary.

Above, in a central position there is screen 10 displaying the name of the road followed by the vehicle. At each fork or each change in the name of a road on a straight course, the display changes. Above, screen 11 displays the length of the section of road that the vehicle is following, which is a useful piece of information for the vehicle driver.

On the right side of the device, symmetrical to the advance button 5, there is a screen 12 for the reference points, displaying the names and symbols of the points of passage required by the itinerary, recorded before the departure by the user on the keyboard. This screen continuously shows the list of these point of passage. When one of them corresponds to an indication appearing on another screen of device 2, such as an intersecting road, for example, it can be arranged so that the illumination of the said point of passage is brightened on the screen 12, for example by a flash.

Referring now to the upper part of the device 2, there is a linear screen 13 displaying a moving line of the information defined above as secondary, that is to say, for example, traffic-safety, municipal or tourist information.

Below this screen 13 there is, respectively on the left and right, two screens, 14 and 15, the first corresponding to the distance remaining to be travelled on the itinerary under way, the second to the total length of this itinerary. Screen 15 displays this distance before the departure, permitting a comparison between itineraries passing through different intermediate points. The distance remaining to be travelled, appearing on screen 14, is evaluated on the basis of the total length by subtraction of the lengths of sections appearing on screen 11.

In the same zone of device 2 there are several screens corresponding to road traffic information to facilitate driving, supplementing the outside indications of the road signs. It is possible, for example, to provide screens indicating no entry to the left 16 or the right 17; speed limit 18; traffic lanes 19 showing a widening or narrowing of the road, one or two-way traffic, two or three lanes, for example; traffic circles 20 with a special rule of right of way; and warning the signs 21, for example.

Below these small screens 16 to 21, there are two rather large screens 22 and 23 for the display of the names of intersecting roads, respectively on the left and right relative to the section of road being followed.

Somewhat lower in FIGS. 2 and 3, the two screens 24 and 25 indicate the rank, in the section being followed, of the next road to be taken, respectively to the left 24 or to the right 25. The display rank 3 on screen 25 signifies that two streets on the right must be passed before turning into the third, and provides advance notice to the user well before he has to alter course. Just the reading of the rank of the street where he has to turn is a useful indication and help to the driving.

All of the elements described above can be considered as common to the various modes of embodiment of the device according to the invention, although the relative dimensions of certain screens may vary. It is essentially in the central part of the device that the means of display differ as a function of the embodiment adopted for the representation of the itinerary to be followed.

FIG. 2 illustrates a first embodiment corresponding to a representation of the direction of travel by oriented arrows or lights. The central part of device 2 bears an axial arrow 26 corresponding to the course followed by the vehicle, and two traverse arrows 27 and 28 corresponding to the instructions "turn left" and "turn right", respectively. The foot of arrow 26 is illuminated to symbolize the vehicle. The tip of arrow 26 is illuminated when the instruction is to go straight ahead, the left hand arrow 27 is illuminated when the instruction is to turn left, and the right hand arrow 28 is illuminated when the instruction is to turn right.

FIG. 3 illustrates a second mode of embodiment corresponding to a representation of the sections of the route. The central part of the device is a screen 29 having two parts separated by a line 34, visible or not. On the left hand part of this screen is shown the section 30 in which the vehicle is located and section 31 which the vehicle is to enter, an which forms an angle with section 30. In this way the user has a display in advance of his next change in direction, the angle of the two sections 30 and 31 corresponding to the angle of the change of course to be planned on. The two sections 30 and 31 are illuminated. Furthermore, screen 29 represents the intersecting roads 32, 33 which are not to be taken but which provide a better knowledge of where the vehicle is. There intersections are shown only for the length of their first section from section 30, this is why their segments on the left and right of the said section 30 can be of different lengths.

On the right hand part of screen 29 is shown the entire itinerary 35 to be followed from the starting point 36 to the point of arrival 37. On this itinerary 35, the itinerary portion represented on the left hand part of the screen is lit more brightly.

In FIG. 3 only two sections 30 and 31 are represented, which are considered sufficient. It goes without saying that it is possible to represent several of them without any problem. As will be seen below, with each change of section, the representation of the route will be reset from the point of intersection of the two sections 30 and 31, section 31 taking the place of section 30 with the new section following it being represented.

According to a third mode of embodiment, the itinerary can be displayed continuously, unwinding as the vehicle advances. It is thus possible to have a herringbone representation, that is rectified as the roads roll by on its first section, at the same base of the screen.

It is also possible to make a fixed representation, oriented toward the north, that is to say a static cartographic representation. The vehicle is then represented by a spot of light on the itinerary display to be followed, enlarged by the loupe effect.

And finally, there is a fourth mode of embodiment, providing guidance on the basis of the intersecting roads successively on the left and the right of the itinerary followed. Compared to FIG. 2 and 3, the only modification resides in the enlargement of screens 22 and 23 of the intersecting roads, so as to bring out, not the identification of the first intersecting road to be crossed but the list of all the intersecting roads on the left and right, respectively, of the itinerary. This display as a list has a threefold function. First of all the selection of the starting and arriving roads can be obtained by running through the alphabetical list of the roads, and stopping it at the desired road which is selected by touching the screen. Then, en route, the intersecting roads on the right and on the left, respectively, pass in continuous progression and line by line from the top to the bottom of the screen. This progression is called "drum winding" or "scrolling". When one of these roads corresponds to a road to be taken, the corresponding name lights up on the screen. And finally the list of reference points can be run through on the screen when an itinerary is selected.

The working of the on-board electronic data processing and display device can be broken down as follows: first take the cartographic support 1 corresponding to the traffic zone (city, rural area, region, for example) and insert it into device 2. The same is done with the support 1a corresponding to the desired general information, historical, touristic or other. Then, by means of keyboard 4 the starting road is defined by its name which is displayed on screen 8 and 10, and the direction of the vehicle relative to the numbers on the road, (increasing or decreasing); then, again by the keyboard, define the destination road which is displayed on screen 9; it is also possible to require passage through one or more intermediate points that are displayed on screen 12. The phase of data instruction is then terminated.

Device 2 is programmed to define an itinerary on the basis of the data supplied to it. The length of this itinerary is then displayed on screens 14 and 15. The user has the possibility of rejecting an itinerary and calling for another one. He also has the possibility of returning to the first if the second one is unsuitable. Once the itinerary is defined, the guidance phase proper begins, with, depending on the mode of representation, the arrow 26 which lights up (FIG. 2), or the sections of roads 30 and 31 appearing on screen 29 (FIG. 3). Then the advance button 5 must intervene to command the successive display of the information relative to the itinerary to be followed as the vehicle progresses.

In the first mode of embodiment (FIG. 2), the advance button has to be pressed every time the user enters a new segment of the itinerary, that is to say for each change in the indication of one of the screens 22 and 23 displaying the names of the intersecting streets. This commands arrows 26, 27, 28.

In the second mode of embodiment (FIG. 3) the advance button must be pressed with each change of section. It commands the resetting of the section followed on screen 29 and the appearance of a new section.

According to the third mode of embodiment, the advance commands the presentation of the itinerary in a herringbone pattern when the device is not linked to the vehicle.

And finally, for the fourth mode of embodiment, the situation is the same as for the first two.

As the vehicle progresses, when a correlation signal is detected, button 56 lights up and if the driver wishes he can operate it by pressure. He can then hear, through the speaker 57, or read on the screen 13, the corresponding general information which is related to the particular point on the itinerary which he is passing through.

It is possible to link the movement of the data relative to a given itinerary to the true travel of the vehicle, provided that the user gives his vehicle the necessary orders to follow the movement of the continuous display. The device can be checked and adjusted to the vehicle, in particular by mechanical means 60 coupled to the vehicle which permits sensing of the distance traveled by the on-board electronics, a compass 62 and inertial movement 64, for example.

And finally, as for every function of the device, it is possible to repeat the displays or reverse the information given.

Thus the electronic guidance device according to the invention provides information on travel, whether linked to the running of the vehicle or not, by an arrow signal, by the progression in steps or continuously of a cartographic representation, or by progression of the names of intersecting roads, describing an itinerary to be followed between a starting point and a destination point, while displaying, in correlation, the actions to be undertaken, all the information necessary for guidance to assist the driving, and at the same time, cultural information. The device can receive instructions by means of the keyboard, or phonically.

It can present this information in visual or phonic form, by screens, lamps, light flashes, sounds or voice, for example. It can be used with any means of transportation or navigation, but it can also be used without a vehicle for travel on foot.

The program included in the on-board device makes it possible to compute, represent and inform on at least one itinerary selected by the user.

Professional extensions, and in particular those assuming the characteristic of a manufacturing process, or a succession of actions reflecting instructions or a method of operation, can be envisaged.

It is also possible to use the electronic guidance system for public transportation systems, in particular for the metropolitan system. It can be applied to the guidance of visits to tourist sites or museums, for example.

In view of its performance, the guidance system according to the invention can be considered as an intelligent guide.

What is claimed is:

1. An electronic guidance and information system for traffic, comprising:
   means for encoding and storing cartographic data and general information data relating to a zone, memory supports for receiving and storing said encoded cartographic data and said general information data, means coupled to said encoding and storing means for reproducing said encoded cartographic data and general information data on said memory supports, on-board electronic data processing and display means, able to receive at least one of said memory supports, for extracting data stored therein and including a control keyboard for the input of information representing a departure location and a destination location, between which the said electronic data processing and display means define an optimized route, display screen means for displaying at least indications for the driver to follow said route, advance means operated at defined sections of the route, said advance means for causing said display screen means to provide a stepwise progression of successive display indications for the driver to follow said route.

2. A system according to claim 1, wherein said means for encoding and storing cartographic data and general information data relating to a zone comprises:

an electronic sensitive screen means including means for converting said extracted data to a graphic representation of a zone of a traffic map with its routes, a keyboard for inputting identification information for the route appearing on said screen, an electronic pen to assure said identification information, whereby the means for encoding and storing encode and memorize the cartographic data relative to each route in said zone, including at least one of the characteristics of each route, the length of the various sections of each route, the width of each route, the name of each route, the orientation with respect to the north of each section of each route, and the particular points of reference of each route.

3. A system according to claim 2, wherein the means for encoding and storing cartographic data and general information data relating to a zone further comprises:

memories to record general information data relating to said zone, including at least one of municipal, historical, economic, commercial, technical or advertising information, a correlation button means coupled to said encoding and storing means so that pressing the correlation button causes the means for encoding and storing to encode and memorize said general information in correlation with the geographical coordinates of the said cartographic data relative to each route of said zone.

4. A system according to claim 1, wherein the means for reproducing is intended for vending to a user memory supports containing selected information and comprises:

said memory supports being dimensioned so as to be handled by a user, memories for storing cartographic data and general information data obtained from the said means for encoding and storing, a dialogue screen for communicating with the user, means for receiving a prepayment from the user, means operated by the user for selecting the cartographic data and the general information data desired, means to receive said memory supports from the user, comprising an admission slot, means for reproducing said selected cartographic data and general information data on said memory supports, means to deliver said memory supports to the user, comprising a delivery slot, whereby said memory supports are received by the system from the user and thereafter delivered from the system to the user when said selected cartographic data and said selected general information data are reproduced.

5. A system according to claim 1, wherein the memory supports are constructed so as to receive said cartographic data and said general information data, from said means for reproducing.

6. A system according to claim 1, characterized in that said display screen means comprise at least one means for providing indications of the departure location, the destination location, a first section of a route where the vehicle is located, a successive section of the route where the vehicle is to enter, the intermediate points of reference, the intersections of routes on the left and on the right, and a rank of turn of the route where the driver is indicated to turn, said indications being determined by said on-board data processing and display means from said input of the starting location and of the destination location.

7. A system according to claim 6, characterized in that said on-board electronic data processing and display means comprises a further screen area for the indications of the total length of the trip, the distance remaining to be travelled, the length of the section of route on which the vehicle is located, that the driver is to follow, and of secondary information, including route traffic lanes and route safety signals, indications of the further screen area being determined by the on-board electronic data processing and display means.

8. A system according to claim 6, characterized in that said on-board electronic data processing and display means comprises oriented arrows representative of driving indications that the driver is to follow, the operation of said arrows being determined by said on-board electronic data processing and display means and the successive actions of the advance means, assuring a stepwise indication of the oriented arrows.

9. A system according to claim 6, characterized in that said on-board electronic data processing and display means comprises a screen area for graphic representations of the itinerary, of the section of route in which the vehicle is located, of the successive sections of route where the vehicle is to enter, the graphic representations being determined by said on-board electronic data processing and display means and the successive actions of the advance means.

10. A system according to claim 6, characterized in that the on-board electronic data processing and display means comprises a screen area for graphic representation of a total itinerary, a displacement of the vehicle being represented by a displacement of a spot of light, and a stepwise progression of said spot of light being determined by said on-board electronic data processing and display means and by the successive actions of the advanced means.

11. A system according to claim 6, characterized in that the said on-board electronic data processing and display means comprises screen area for scrolling the names of said intersecting routes with the last name wrapping back to the first, said names of said intersecting routes being determined by the said on-board electronic data processing and display means and by the successive actions of the advance means.

12. A system according to claim 9, characterized in that said successive actions of the advance means provide a step by step progression of the sections of route on the said screen, a replacement of the section of route where the vehicle is located with the section of route where the vehicle is to enter, a replacement of the information corresponding all such routes, and said step by step progression being determined by said on-board electronic data processing and display means.

13. A system according to claim 8, characterized in that said on-board electronic data processing and display means comprises means coupled to the vehicle for determining the distance traveled thereby, and successive lighting of said oriented arrows and of the corresponding indications being in relationship to the distance traveled.

14. A system according to claim 9, characterized in that said on-board electronic data processing and display means comprises means coupled to the vehicle for determining the distance traveled thereby, and continuous replacement of said graphic representation of said section of route where the vehicle is located by said graphic representation of the said section of route where the vehicle is to enter and of the corresponding indications, being effected by communication between said means for determining the distance traveled and said on-board electronic data processing and display means.

15. A system according to claim 10, characterized in that said on-board electronic data processing and display means comprises means coupled to the vehicle for determining the distance traveled thereby, and continuous displacement of said spot of light representing the displacement of the vehicle on said graphic representation of the total itinerary being effected by communication between said means for determining the distance traveled and said on-board electronic data processing and display means.

16. A system according to claim 11, characterized in that said on-board electronic data processing and display means comprises means coupled to the vehicle for determining the distance traveled thereby, and said continuous scrolling of the names of the intersecting routes being effected by communication between said means for determining the distance traveled and said on-board electronic data processing and display means.

17. A system according to claim 8, characterized in that coordination of said successive lighting of said oriented arrows and of the corresponding indications is adjusted to the true travel of the vehicle by compass means or inertial movement means coupled to said data processing and display means, said adjustment of the true travel of the vehicle being determined by said on-board electronic data processing and display means.

18. A system according to claim 9, characterized in that coordination of said replacement of said graphic representation of the said section of route where the vehicle is located with said graphic representation of said section of route where the vehicle is to enter, and of the corresponding indications, is adjusted to the true travel of the vehicle by compass means or inertial movement means coupled to said data processing and display means, said adjustment of the true travel of the vehicle being determined by said on-board electronic data processing and display means.

19. A system according to claim 10, characterized in that coordination of continuous displacement of the spot of light representing the displacement of the vehicle on said graphic representation of the total itinerary is adjusted to the true travel of the vehicle by compass means or inertial movement means, coupled to said data processing and display means, said adjustment of the true travel of the vehicle being determined by the on-board electronic data processing and display means.

20. A system according to claim 11, characterized in that the scrolling of the names of intersecting routes with the last name wrapping back to the first is adjusted to the true travel of the vehicle by compass means or inertial means coupled to said data processing and display means, said adjustment of true travel of the vehicle being determined by the on-board electronic data processing and display means.

21. A system according to claim 1, characterized in that said on-board electronic data processing and display means comprises control buttons and means operated by said control buttons for providing at least one of visual and audible indications to a user of said general information related to noteworthy points of the itinerary in said zone, said general information on noteworthy points being selected by the on-board electronic data processing and display means from the cartographic data of the route.

22. A system in accordance with claim 4 wherein said means for receiving a prepayment comprises one of a money receiver and a credit card receiver.

23. A system in accordance with claim 4 wherein said means for selecting comprises a keyboard.

24. A system in accordance with claim 4 wherein said memory supports comprise memory cards.

25. A system in accordance with claim 1, wherein said advance means is a manually operated button.

26. A system in accordance with claim 1, wherein said on-board electronic data processing and display means further comprises means for controlling said display screen means to provide a substantially continuous representation of said route, which said representation is reoriented as necessary so as to maintain the direction of vehicle travel on said representation in a predetermined orientation, whereby said indications for the driver to follow said route are always in a fixed, predetermined relationship to the route which the driver follows.

27. A system according to claim 8 wherein said oriented arrows include an axial arrow corresponding to the course followed by the vehicle, the axial arrow having a tail symbolizing the vehicle.

28. A system in accordance with claim 1, wherein said on-board electronic data processing and display means further comprises means for controlling said display screen means to provide a representation of said route, including the section of route in which the vehicle is located and the section of route in which the vehicle is to enter, so that upon each entry into a new section by the vehicle, the representation of said route is reset from the point of intersection of said sections of route in which the vehicle is located and which the vehicle is to enter, the section of route where the vehicle is to enter taking the place of the section of route where the vehicle is located.

29. A system according to claim 1 wherein said on-board electronic data processing and display means further includes means for providing audible information for the driver to allow said route.

* * * * *